US008326803B1

(12) United States Patent
Stringham

(10) Patent No.: US 8,326,803 B1
(45) Date of Patent: Dec. 4, 2012

(54) CHANGE TRACKING OF INDIVIDUAL VIRTUAL DISK FILES

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 252 days.

(21) Appl. No.: 12/775,245

(22) Filed: May 6, 2010

(51) Int. Cl.
G06F 7/00 (2006.01)
G06F 17/00 (2006.01)

(52) U.S. Cl. ........................................ 707/652; 707/821

(58) Field of Classification Search .................... 707/652
See application file for complete search history.

(56) References Cited

U.S. PATENT DOCUMENTS

| 7,039,778 | B2* | 5/2006 | Yamasaki | 711/162 |
| 7,239,545 | B2* | 7/2007 | Hosotani | 365/171 |
| 7,370,164 | B1* | 5/2008 | Nagarkar et al. | 711/162 |
| 7,669,020 | B1* | 2/2010 | Shah et al. | 711/162 |
| 7,721,097 | B2* | 5/2010 | Muramatsu et al. | 713/168 |
| 8,046,550 | B2* | 10/2011 | Feathergill | 711/162 |
| 8,099,391 | B1* | 1/2012 | Monckton | 707/647 |
| 8,117,168 | B1* | 2/2012 | Stringham | 707/646 |
| 2007/0244938 | A1* | 10/2007 | Michael et al. | 707/204 |
| 2008/0177809 | A1* | 7/2008 | Murayama et al. | 707/204 |
| 2009/0119538 | A1* | 5/2009 | Scales et al. | 714/6 |
| 2009/0172324 | A1* | 7/2009 | Han et al. | 711/162 |
| 2010/0049930 | A1* | 2/2010 | Pershin et al. | 711/162 |
| 2011/0010515 | A1* | 1/2011 | Ranade | 711/162 |
| 2011/0082834 | A1* | 4/2011 | Murayama et al. | 707/640 |
| 2011/0252208 | A1* | 10/2011 | Ali et al. | 711/162 |

* cited by examiner

Primary Examiner — Binh V Ho
(74) Attorney, Agent, or Firm — Campbell Stephenson LLP

(57) ABSTRACT

A first write operation is intercepted. The first write operation is a write from a virtual machine to a virtual disk. The first write operation is a change to a first data location. The change to the first data location is recorded. The recording creates a first change record. The first change record is stored separately from the first data location. A first backup operation is performed. The first backup operation, the intercepting, and the recording are performed by an application executing on a host of the virtual machine. The first backup operation includes a read request for the first data location. The read request for the first data location is fulfilled based on the first change record.

14 Claims, 7 Drawing Sheets

| Header 315 | First Data Record 325(1) | Second Data Record 325(2) | Third Data Record 325(3) | ... | Nth Data Record 325(n) |

Secondary Storage Location 155(N)

*Fig. 3B*

| Header 310 | First Change Record 320(1) | Second Change Record 320(2) | Third Change Record 320(3) | ... | Nth Change Record 320(n) |

Change Record Data Structure 175(n)

*Fig. 3A*

CHANGE TRACKING OF INDIVIDUAL VIRTUAL DISK FILES

FIELD OF THE INVENTION

This invention relates to data processing systems, and in particular, managing virtual data processing systems. Still more particularly, this invention relates to managing backup of files associated with virtual data processing systems.

BACKGROUND OF THE INVENTION

As modern network connectivity improves, distributed computing is becoming more common. A distributed computing system can include multiple computing nodes (also referred to simply as "nodes") that communicate through a network to access data stored on a shared storage object. The shared storage object can be implemented using a storage area network (SAN).

While modern network connectivity improves, modern computers are also becoming more powerful. This increased computing power can be harnessed by implementing virtual machines. Virtual machines are software implementations of physical computers that execute computer instructions in a manner that replicates the results of physical computer hardware. Many of today's computer systems, such as computing nodes in a distributed computing system, are able to act as host computer systems to multiple virtual machines. The virtual machines implemented by computing nodes can also access data stored on a shared storage object.

Many distributed computing systems offer an advantage in the form of fault tolerance. In other words, if one of the nodes becomes unavailable due to failure, maintenance, or increased consumption of computing resources, one or more of the other nodes in the distributed computing system can transfer pending tasks from the failed node.

In order to provide improved fault tolerance, distributed computing systems need to be able to protect against data loss due to failures or errors. One way to safeguard against such data loss is by implementing a backup application. The backup application, which can be executed on at least one of the nodes on a distributed computing system, can periodically backup the data stored on the shared storage object. In the event of a failure that results in data loss or corruption, the data on the shared storage object can be recovered via a backup or data archive created by the backup application.

One drawback to such an implementation of a backup application is that performing a backup of the entire shared storage object can be time and resource intensive (both in computing and network resources), particularly in the case of a very-high capacity shared storage object shared by a large number of nodes. Where multiple virtual machines execute on a particular node, it can be desirable to reduce the demands of a backup application by limiting backup operations to only the portions of the shared storage object accessed by particular virtual machines implemented by the nodes, because the presence of multiple virtual machines presents the possibility of compounded parallel backup demand. Further, conventional backup methods allow a backup of one virtual machine to impact the performance of other virtual machines when a snapshot is held for the full shared storage object to support a virtual machine that is being backed up. But backing up only the portions of the shared storage object accessed by the virtual machines traditionally requires an installation of an instance of a backup application within each individual virtual machine. The need for a backup application within each virtual machine has traditionally resulted from the inability of the file system of the host node to correlate disk access to a particular virtual machine.

Installation and operation of a backup application on each virtual machine greatly complicates the administration of the distributed computing system, since a system administrator must install, coordinate and maintain each individual instance of the backup application. For example, in a scenario where a node supports multiple virtual machines, the computing input/output resources of the node can be taxed if each virtual machine supported by the node simultaneously executes an instance of the backup application. Thus, what is desirable is an approach that enables at least partial backups of a shared storage object, but does not require the installation of a backup application within each virtual machine supported by a distributed computing system.

SUMMARY OF THE INVENTION

A first write operation is intercepted. The first write operation is a write from a virtual machine to a virtual disk. The first write operation is a change to a first data location. The change to the first data location is recorded. The recording creates a first change record. The first change record is stored separately from the first data location. A first backup operation is performed. The first backup operation, the intercepting, and the recording are performed by an application executing on a host of the virtual machine. The first backup operation includes a read request for the first data location. The read request for the first data location is fulfilled based on the first change record.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 3A illustrates a change record, according to one embodiment.

FIG. 3B illustrates a secondary storage location, according to one embodiment.

Figure 1:
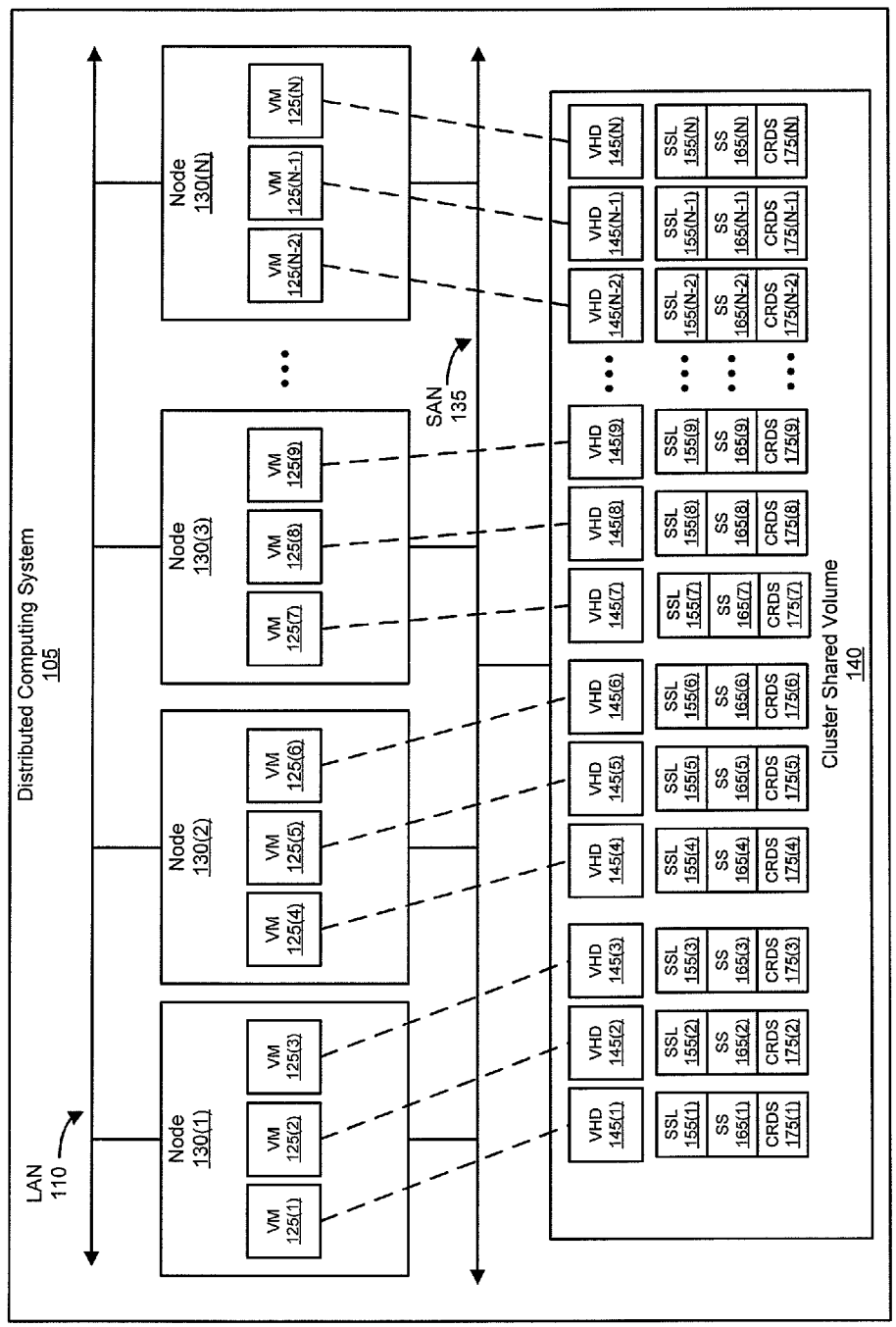
FIG. 1 is a block diagram illustrating a system that includes a collection of nodes and a cluster shared volume (CSV).

While the present invention is susceptible to various modifications and alternative forms, specific embodiments are provided as examples in the drawings and detailed description. It should be understood that the drawings and detailed description are not intended to limit the present invention to the particular form disclosed. Instead, the intention is to cover all modifications, equivalents and alternatives falling within the spirit and scope of the present invention as defined by the appended claims.

DETAILED DESCRIPTION

Embodiments of the present invention allow a computing system to make backups of individual data structures that include virtual disks, such as virtual hard drives and other virtual storage media associated with a virtual machine. In one embodiment, a distributed computing system includes a collection of nodes that accesses and modifies data stored on a storage object (e.g., a cluster shared volume, though other storage objects, some of which can be shared storage objects can be used). Each node in the collection of nodes also implements at least one virtual machine, which accesses and stores data within one or more virtual disks embodied as files on the storage object. The backups of the individual files that contain the data embodying the virtual hard drives are made without installing a backup application or utility in any of the virtual machines implemented by the nodes of the distributed computing system.

According to one embodiment, a node hosting one or more virtual machines includes at least one file filter driver. The file filter driver is, in some embodiments, installed by an installation module. A file filter driver records changes made by write operations from the virtual machine(s) to data at a data location on virtual disks embodied as files on the storage object. The file filter driver records the changes to a change record within a change record data structure. In some embodiments of the present invention, a file filter driver can be implemented as multiple drivers. For instance, a first driver can perform change tracking and another which performs the copy-on-write functionality necessary to implement a snapshot. Each change record can be stored on the storage object or, in an alternative embodiment, locally on the node that generated the change list. Change records are stored in a change record data structure that is separate from the data structure itself. In some embodiments, the node is part of a distributed computing system and the storage object is a shared storage device such as a cluster shared volume. In such an embodiment, the change records can be aggregated into a composite change record that records all the changes made by all of the virtual machines executing on all of the nodes in the distributed computing system. Embodiments of the invention can store the composite change records on the storage object.

A node can also implement a backup application. The backup application performs a variety of functions including snapshot and backup generation. Periodically, the backup application takes snapshots of files on the storage object. A snapshot is a point-in-time copy of the data stored in a file on the storage object that is initiated to facilitate a backup. After the snapshot is taken, the backup application periodically generates backup copies from the snapshot. A backup copy can be used to restore an original copy of data after a data loss event.

Generally, backup applications perform two major types of backups: full backups and incremental backups. A full backup of a data structure, (e.g., a file) includes a complete copy of the data structure as stored on the storage object. An incremental backup attempts to backup only part of the data stored in the data structure on the storage object, such as data that has been changed since a prior backup (e.g., the most recent backup). The prior backup relative to the incremental backup can be a full backup or an earlier incremental backup. In order to reduce interruption of access to a data structure or storage object due to backup processing, a full backup is generally performed by generating a snapshot image of the stored object and performing operations on (e.g., copying) the snapshot, rather than the data structure or storage object that is subject to the backup.

A snapshot image is a point-in-time representation of one or more data objects or data structures, such as virtual disks associated with the virtual machine. When a backup application requests a snapshot of a file containing the data of a virtual disk on a storage object, the node will, in some embodiments, propagate a quiesce event to the virtual machine associated with the virtual disk. A quiesce event causes applications executing on the virtual machine to first update their data files to a consistent state by sending locally stored data changes to the storage object. Then, the quiesce event causes the applications to temporarily suspend access to the file containing the virtual disk. Once access to the file containing the virtual disk has been temporarily suspended and operations on the data are completed, the file is in a consistent state. A file is in a consistent state when all pending transactions to that data stored on the storage object have been completed, or enough information has been written to the storage object to either complete or rollback incomplete transactions to the file. Once the node indicates to the backup application that the quiesce event has been received and completed, the backup application takes a snapshot of the file. In one embodiment, if an application has not completed changes to the live volume when the snapshot is taken, additional changes to the file are recorded in a change record and original data from changed areas of the file is recorded to a secondary storage location by the file filter driver.

Once the backup application generates a snapshot, the file filter driver can update a change record data structure associated with the file for which the snapshot was taken. The update to the change record data structure can indicate all changes detected as occurring before the snapshot was taken. According to one embodiment, the file filter driver can accomplish this indication by starting a new change record data structure to record changes occurring after the snapshot. According to another embodiment, the file filter driver can continue modifying the current change record data structure, but the file filter driver can provide a marker in the change record data structure that separates the changes that occurred before the snapshot from the changes that occurred after the snapshot.

Once the snapshot is complete, the backup application can generate a backup from the snapshot. As previously discussed, the backup can be a full backup, which is a complete backup of all the data of the file on the storage object at the particular point-in-time that the snapshot was taken. To the extent that changes are made to the live volume after snapshot creation, the change record can be used to read data from the secondary storage area. The backup can also be an incremental backup, which is a backup of all changes made to the data on the storage object since a previous backup. A list of such changes can be extracted from the change records in the change record data structure.

FIG. 1 is a simplified block diagram that illustrates a distributed computing system that can be used to implement embodiments of the invention. As illustrated, distributed computing system 105 includes a collection of computing nodes 130(1)-(N). These nodes communicate with each other via a network such as a local area network (LAN) 110. The nodes are further coupled via, for example, a storage area network (SAN) 135 to enable communication with the storage object. One implementation of the storage object is a cluster shared volume 140, though one skilled in the art will readily understand, in light of the present disclosure, that other implementations will use other storage devices without departing from the scope of the current invention. An example of a cluster shared volume 140 is a collection of hard disk drives aggregated to form at least one volume accessible for read and write operations by all nodes in distributed computing system 105. Also, according to one embodiment, cluster shared volume 140 can be formatted with a file system (e.g., New Technology File System (NTFS) or NFS).

FIG. 1 further illustrates a collection of virtual machines (VMs) 125(1)-(N) supported by nodes 130(1)-(N). As an example, these virtual machines are simulations of a physical computer that execute computer instructions in a manner that produces results expected of the physical computer. Virtual machines 125(1)-(N) read and write data to a collection of virtual disks called virtual hard drives (VHD) 145(1)-(N) allocated on cluster shared volume 140. Each of VHD 145(1)-(N) is actually a file stored on cluster shared volume 140. For example, virtual machine 125(1) reads and writes data to virtual hard drive 145(1). While FIG. 1 illustrates twelve virtual machines and twelve virtual hard drives, embodiments of the invention can support any number of virtual machines and virtual hard drives. During operation of distributed computing systems, some virtual machines can utilize more than one virtual hard drive, and thus some embodiments may implement differing numbers of virtual machines and virtual hard drives.

While the letter "N" is used to refer to refer to a variable number of items, in the case of different uses of the letter "N", a constant or equal number of items are not implied. For example, FIG. 1 illustrates twelve virtual machines 125(1)-(N) supported by four nodes 130(1)-(N). The number of items that is indicated may not (or may) be equal. The use of the variable "N" is indicated to mean a variable quantity that can change from embodiment to embodiment (and from item to item) without departing from the scope of the present invention. Where "N" is used to represent multiple quantities, even in the same figure, those quantities are not necessarily equal, though, in some embodiments, those quantities may be equal.

FIG. 1 additionally includes a set of change record data structures (CRDS) 175(1)-(N). Changes to each virtual hard disk file 145(1)-(N) are recorded to corresponding change records within change record data structures 175(1)-(N). FIG. 1 additionally includes snapshots (SS) 165(1)-(N), which are point-in-time copies of the data stored in corresponding virtual hard disk files 145(1)-(N) and can be used for performing backup operations. If a snapshot is in progress or other conditions cause a need for retention of original data after a change is written to a virtual hard disk file, secondary storage locations (SSL) 155(1)-(N) can be used to store original data that existed at a data storage location prior to a change to the data. In one embodiment, data in secondary storage locations 155(1)-(N) can be associated to particular data storage locations using identification information stored in change record data structures 175(1)-(N). In an alternative embodiment, data in secondary storage locations 155(1)-(N) may be associated to particular data storage locations using identification information stored in a separate data structure (not shown).

Snapshots 165(1)-(N), change record data structures 175(1)-(N), and secondary storage locations 155(1)-(N) are shown as being stored separate from but on the same cluster shared volume 140 as their associated virtual hard disks 145(1)-(N). In alternative embodiments, however, snapshots 165(1)-(N), change record data structures 175(1)-(N), and secondary storage locations 155(1)-(N) may be stored on a storage object separate from the storage object of their associated virtual hard disks 145(1)-(N). While FIG. 1 illustrates twelve snapshots, twelve change record data structures, and twelve secondary storage locations, embodiments of the invention can support any number of snapshots, change record data structures, and secondary storage locations. During operation of the distributed computing system, operations of a node with respect to some virtual machines can utilize more than one change record data structure, secondary storage location, or snapshot, and thus some embodiments may implement differing numbers of change record data structures, secondary storage locations, and snapshots.

Figure 2:
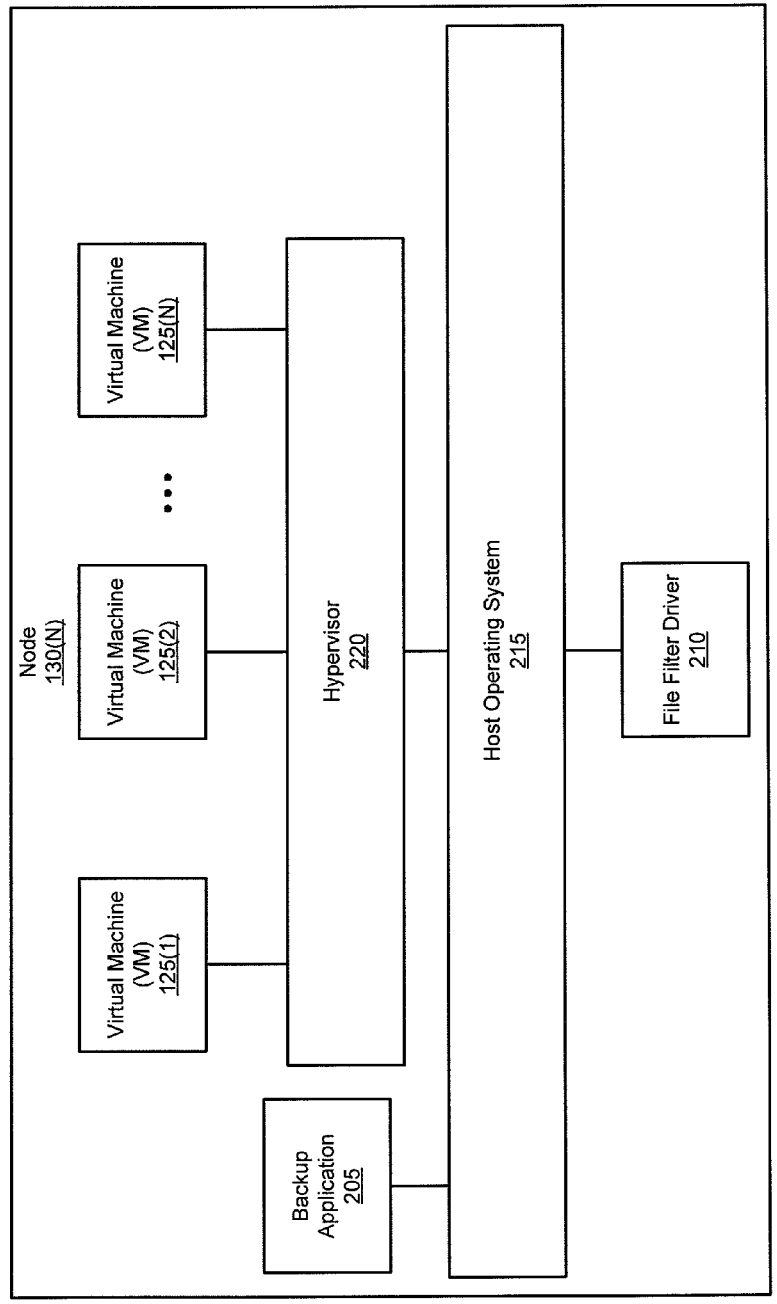
FIG. 2 is a block diagram illustrating processes executing on a node equipped to perform backup operations on virtual hard disk files associated with virtual machines.

FIG. 2 is a block diagram illustrating processes executing on a computing node (e.g., node 130(N) of FIG. 1), according to one embodiment. As illustrated, node 130(N) includes a backup application 205, a host operating system 215, a hypervisor 220, a file filter driver 210 (associated with host operating system 215 or, in an alternative embodiment, associated with hypervisor 220), and virtual machines 125(N-2)-(N), all of which are discussed herein in more detail. Note, that while the example node portrayed in FIG. 2 supports three virtual machines, the number of virtual machines will vary among embodiments and implementations of the current invention.

Host operating system 215 is the operating system that supports backup application 205 and hypervisor 220. As previously discussed, backup application 205 periodically requests snapshots from file filter driver 210 and generates backup copies using those snapshots. File filter driver 210 intercepts write operations and assesses whether the write operations include changes to files associated with virtual machines 125(N-2)-(N). If a write operation does not include a change to a file associated with virtual machines 125(N-2)-(N), the write operation is released for execution. If a write operation includes a change to a file associated with virtual machines 125(N-2)-(N), file filter driver 210 creates or updates a change record for the write operation in a change record data structure associated with the virtual machine 125(N-2)-(N) that sent the write operation, without involvement of the virtual machines 125(N-2)-(N) or any need to install additional software on the virtual machines 125(N-2)-(N) to support the intercepting and recording operations. The write operation is then released for execution.

Backup application 205 periodically requests snapshots of the data stored in files on a storage object, such as the cluster shared volume of FIG. 1. As discussed above, a snapshot is a point-in-time virtual copy of the data stored on the cluster shared volume at a particular time. For example, a snapshot of the data stored on the cluster shared volume at time $T_1$ shows version A of the data. A snapshot taken at a later time ($T_2$) shows version B of the data, where version B includes all of the completed changes to the data made since time $T_1$.

A snapshot can be implemented as non-modifiable or modifiable. A non-modifiable snapshot is an image of data stored on the cluster shared volume that cannot be changed after the snapshot is taken. When implementing non-modifiable snapshots, all changes (generated by applications and operating systems executing on the distributed computing system) to data must be completed and sent to the cluster shared volume before the snapshot can be taken in order to establish a completely consistent image of the data at a particular point in time.

A modifiable snapshot can be changed after generation of the snapshot, and the resulting changes can be recorded within the snapshot. For example, after a modifiable snapshot of a file is created for a particular virtual machine, file filter driver 210 can record changes to the snapshot separately from changes it records to the corresponding live virtual disk file as a node accesses the virtual hard disk files corresponding to that virtual machine. The virtual hard disk files are represented by separate virtual snapshot volumes within the corresponding virtual machine. As a result, applications executing in a virtual machine can make modifications to the files in the virtual snapshot volumes, which result in changes to the virtual hard disk files of the virtual snapshot volume. For example, applications within a virtual machine can write to the virtual snapshot volumes to modify or truncate log files or perform actions that place the virtual disk files in a clean state. The resulting changes are recorded in change records in corresponding change record data structures. Additionally, original data, recorded before the changes, can be copied to and stored in a secondary storage location on the cluster shared volume. After all the applications within the virtual machine being quiesced notify the virtual machine that the applications do not have any further modifications to make to the data in the virtual snapshot volumes, the modifiable snapshot is placed into a read-only state.

File filter driver 210 tracks all the changes made to the modifiable snapshot by intercepting and recording write operations. In one embodiment, the change record data structure includes a list of all changes that occurred before notification and all changes that occurred after notification. As discussed above, file filter driver 210 tracks changes to data made to virtual hard disk files and snapshots of virtual hard disk files on the cluster shared volume by the node on behalf of virtual machines 125(N-2)-(N). The changes to data are recorded by file filter driver 210 in a change record data structure (discussed herein in more detail in conjunction with FIG. 3A).

Once the snapshot is taken, backup application 205 can make a copy of the snapshot to generate a full or incremental backup. The backups generated by backup application 205 can include full backups or incremental backups. A full backup is a backup of all the data stored on in a file. An incremental backup is a backup of data stored in a file that has been modified since a preceding backup. The preceding backup can be a full backup or an incremental backup. A process used by the backup application to perform backups of the data stored on the cluster shared volume will be discussed in detail in conjunction with FIG. 4B.

Hypervisor 220 is software and/or hardware that provides node 130(N) the ability to concurrently support virtual machines 125(1)-(3). Hypervisor 220 coordinates distribution of host computer resources (e.g., processing power, memory, etc.) among virtual machines 125(N-2)-(N). A host computer system supporting multiple virtual machines manages system resources to present a hosted virtual environment to each of the virtual machines. Each virtual machine shares the host computer system's resources. Processor resources and memory management are provided to each virtual machine. Virtualization functionality can be provided, for example, through the use of a system virtual machine (sometimes referred to as a hardware virtual machine), which allows sharing of the underlying physical machine resources between different virtual machines, each running its own operating system.

In order for the virtual machines to successfully co-exist, host system software and/or hardware should coordinate and manage demands for host system resources. If all of the virtual machines supported by a particular host computer request the same resource (e.g., processor, memory, or communication resources, etc.) at the same time, the host computer may not be able to effectively perform requested tasks. A virtualization component (e.g., a software abstraction layer) that is commonly referred to as a "hypervisor" (e.g., hypervisor 220) coordinates and manages host resources. The hypervisor coordinates processor resources to execute instructions on behalf of the various virtual machines, and performs memory management to ensure effective sharing of the host system memory.

During the operation of a distributed computing system, nodes support virtual machines that access and modify data stored in a cluster shared volume. The data is stored within virtual hard drive files on the cluster shared volume. In order to generate incremental backups of the data stored in the files, the changes made to the data by the nodes are tracked by file filter drivers. The changes are tracked to ensure that any modifications made to data since the last backup are properly backed up, without the need to backup data that hasn't changed. According to embodiments of the invention, file filter drivers record the changes in change records of change record data structures.

According to one embodiment, a change record can be implemented as a bitmap or a run list. In either implementation, the changes can be tracked at varying degrees of granularity. In one embodiment, changes are tracked at a block level where a block can correspond to a sector or cluster (e.g., typically 4K in the case of NTFS), but can also track at a less granular level (e.g., 64K, which corresponds to 128 sectors) to reduce the number of blocks tracked.

When implemented as a bitmap, the change record includes one bit for each block tracked. Setting a bit corresponding to a block indicates that that particular block has been modified.

A run list is a data structure containing a set of runs (also referred to as extents). A run includes a starting block number and a count of subsequent blocks that have also been modified. If a block is modified, the run list is searched to determine if the block is part of a run that is already identified in the run list. If the block is included in a run that is already identified in the run list, the run list is up-to-date. If the block is included immediately after a run in the run list, the count for the run is incremented by one. If the block is included immediately before a run in the run list, the start value is decremented by one and the count is incremented. If the block is not included in or adjacent to a run already in the run list, then a new run of count one is created and added to the run list. As a result of this configuration, one advantage of the run list over the bitmap is that no resource penalty exists for tracking changes at the byte level rather than only at the block level. This is due to the fact that a run doesn't require any more space for the extra granularity, whereas a bitmap can become unacceptably large if it required one bit for each byte of each file being tracked.

FIG. 3A illustrates an example of a change record data structure 175($n$), such as a run list or a bitmap. The change record data structure includes a header 310 and a series of change records 320(1)-(N), which can be embodied as extents in a run list or a bit series in a bitmap. Header 310 includes information associating the change records 320(1)-(N) with a particular file. In one embodiment of the present invention, a change record data structure records changes to a single virtual disk file. Alternative embodiments of the invention implement a change record data structure supporting changes on multiple virtual disk files. Header 310 can also include information indicating the time associated with a particular change record or a change record data structure, either in absolute time, such as a system time stamp, or in a relative time designation, such as before or after a particular backup or snapshot was created. In one embodiment, each of change records 320(1)-320(N) contains a data location of a change to a virtual disk file. In addition, some embodiments of the present invention include in change records 320(1)-320(N) a pointer to a secondary storage location of original data, which was recorded prior to the changes referenced in the respective change records 320(1)-320(N). Further, some embodiments include a time stamp for individual changes or an indication that a particular change record was generated before or after a particular snapshot or backup was completed or, alternatively, before or after a particular snapshot or backup was initiated.

Each of change records 320(1)-320(N) tracks a data location. A data location can represent any disk allocation unit including, but not limited to, a disk sector, disk block, or disk cluster. For example, when a file filter driver detects a write operation to a disk block, the file filter driver creates within a change record 310(N) an entry corresponding to that disk block. The entry indicates that that disk block has been modified.

FIG. 3B illustrates a secondary storage location. In one embodiment of the present invention, when information in a virtual disk file is changed by a write operation, original data from the virtual disk file is copied to a secondary storage location (e.g., secondary storage location 155(N) and stored in a data record (e.g., data records 325(1)-(N)). Data records 325(1)-(N) contain copies of original data, prior to changes recorded in a respective change record associated with each data records 325(1)-(N). Header 315 contains identifying information, such as an identifier of the virtual machine with which data records 325(1)-(N) are associated.

Figure 4A:
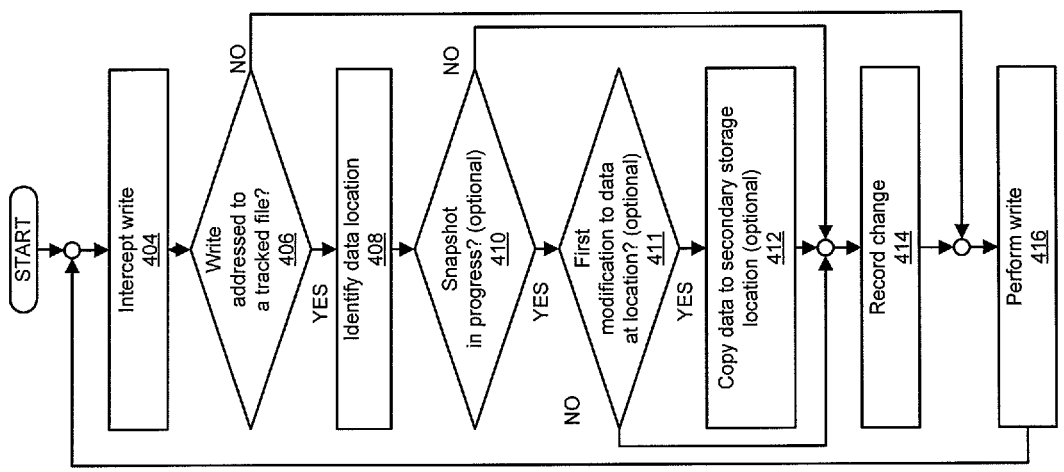
FIG. 4A is a flowchart illustrating a process for monitoring changes to files associated with virtual machines, as performed by a node, according to one embodiment.

FIG. 4A is a flowchart illustrating a process for monitoring changes to virtual disk files associated with virtual machines, as performed by a node, according to one embodiment. Such a process can be continuously executed by a file filter driver and can be initiated at the startup of the file filter driver. A write operation is intercepted by receiving the write operation and holding it in a queue before it is released to a storage object (404). In one embodiment, the write operation is intercepted by a file filter driver 210. After a write operation is intercepted, a determination is made as to whether the write operation is addressed to a file for which changes are being tracked (406). If the intercepted write operation is not targeted to a file for which changes are being tracked, then the write operation is allowed to execute and the write is performed (416). The process then returns to step 404 for the next write operation.

If the intercepted write operation is addressed to a file for which changes are being tracked, a data location to which the write operation is addressed is identified (408). A determination is made as to whether a snapshot is in progress (410). A second determination is made as to whether the present write operation is a first modification to data location at the location to which the write operation is addressed (411). For purposes of the second determination, a mere extension of a file by appending new data is not a first change to the data, because no existing data is overwritten. If a snapshot is in progress and the write operation is such a first change, original data stored at the data location to which the write is addressed is copied to a secondary storage location (412) for later snapshot reconciliation. If no snapshot is in progress, or during or after completion of the copying, the change to the data is recorded to a change record in a change record data structure (414). Note that, in some embodiments of the present invention, the ordering of steps 410-414 may differ from that shown. The steps may be executed in a different order or in parallel. The write is performed (416) and the process returns to step 404, which is described above.

In an alternative embodiment, the present invention is practiced without steps 410-412, which are optional. In such an embodiment, a location identification (408) may be followed by recording a change record of the change to the data (414).

Figure 4B:
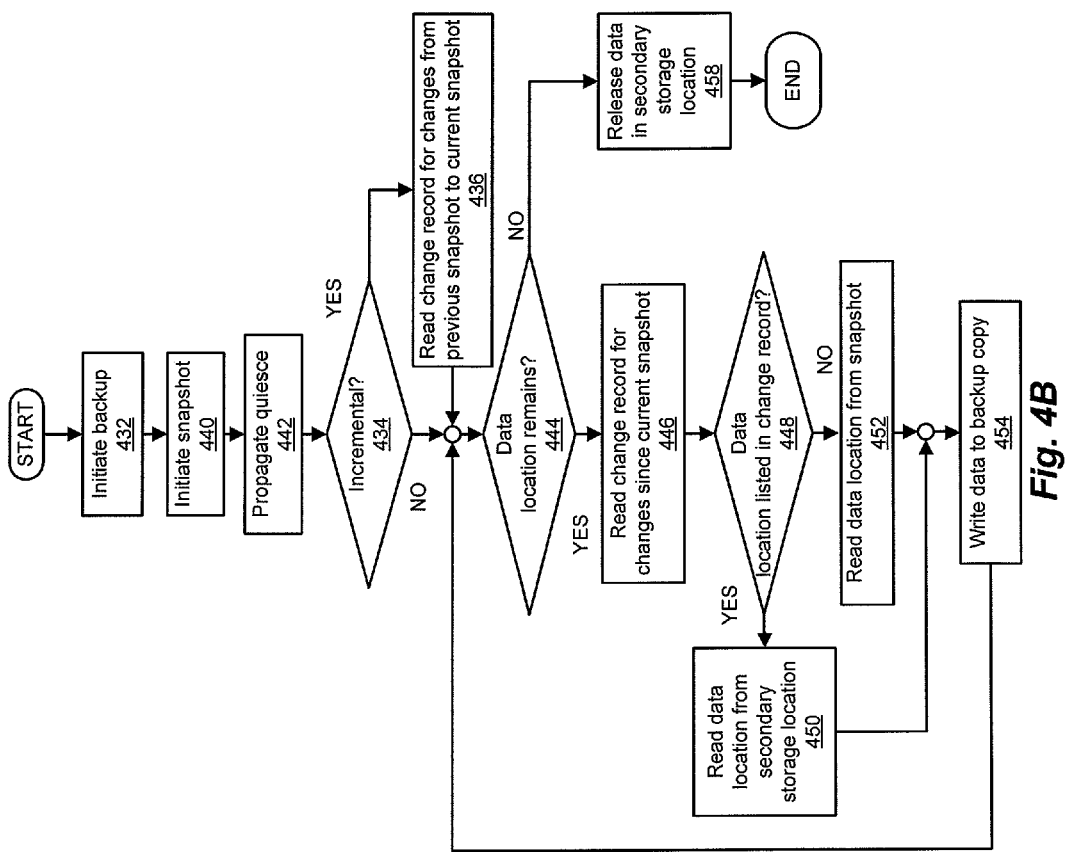
FIG. 4B is a flowchart illustrating a process for managing backup of virtual machines, as performed by a node, according to one embodiment.

FIG. 4B is a flowchart illustrating a process for managing backup of virtual machines, as performed by a node (e.g., node 130(N)), according to one embodiment. A backup operation is initiated (432). A snapshot is initiated (440). A quiesce operation is propagated to the virtual machine associated with the file for which backup operations have been initiated (and, in some embodiments, to applications of the virtual machine) (442). As stated above, a quiesce event causes applications executing on the virtual machine to first update their data files to a consistent state by sending locally stored data changes to the storage object. Then, the quiesce event causes the applications to temporarily suspend access to the file containing the virtual disk, while the snapshot is finalized.

A determination is made as to whether the backup operation is an incremental backup, which tracks changes after a previous backup, or a full backup (434). If the backup operation is incremental, a change record is read (436) for changes occurring between a previous snapshot and the snapshot. In one embodiment, the change record data structure contains the record of all changes made between the creation of the snapshot used for a prior backup up until the current backup. Changes occurring while the current backup is in progress may be recorded in a separate change record data structure (or a continuation of the current change record data structure) and would be used, for example, during a subsequent backup. They are also used in step 446.

A determination is made as to whether a data location remains for which data has not been copied to the backup and data is to be read (444). Note that, for a full backup, a data location remains if any portion of the VHD that is allocated by the file system has not been backed up. Conversely, in an incremental backup, a data location remains if there is a location that has not been copied and has changed since the previous backup. If no data location remains for which data is to be read, data in a secondary storage location is released by marking any space allocated to the secondary storage location as available for overwriting (458). The process then ends.

Returning to step 444, if an additional data location remains for which data is to be read, one or more change records are read from a change record data structure (446) to ascertain whether the remaining data locations have changed since the current snapshot. The change record data structure tracks changes to files since the snapshot being used for the current backup operation was taken. A determination is made as to whether a data location that needs to be read is listed as having changed in a change record from the change record data structure (448) and fulfillment of read requests are thereby based on the change record. If the data location that needs to be read is listed as having changed in a change record from the change record data structure, then the data for the data location is read from a secondary storage location (450). If the data location that needs to be read is not listed as having changed in a change record from the change record data structure, then the data for the data location is read from its original location (452). After reading the data associated with the data location, the data is written to a backup copy (454). The process then returns to step 444, which is described above.

Using the processes described above, a file filter driver is able to track changes to a data structure containing the data of a virtual storage device, such as a virtual hard disk, of a virtual machine. This change tracking, and the recording of original data when changes are made during a snapshot, enables significantly reduced resource consumption in performing backup operations. In addition, the present invention is beneficial for backing up a virtual machine in situations where files other than those associated with the virtual machine that is being modified exist on the same volume as the virtual hard disks for the virtual machine, regardless of whether the storage location is local disk, or shared storage, such as a clustered shared volume. This benefit arises from the fact that the snapshot of the virtual hard disks for the virtual machine does not require a snapshot the full volume, but only the virtual hard disks currently being backed up. Thus the copying of original data that is being modified is not occurring for those other files. Change tracking is also not required for those other files (unless they are also virtual hard drives being used by other virtual machines that will be backed up at a different time).

Elements of network architecture can be implemented using different computer systems and networks. An example of one such network environment is described below with reference to FIG. 5.

Figure 5:
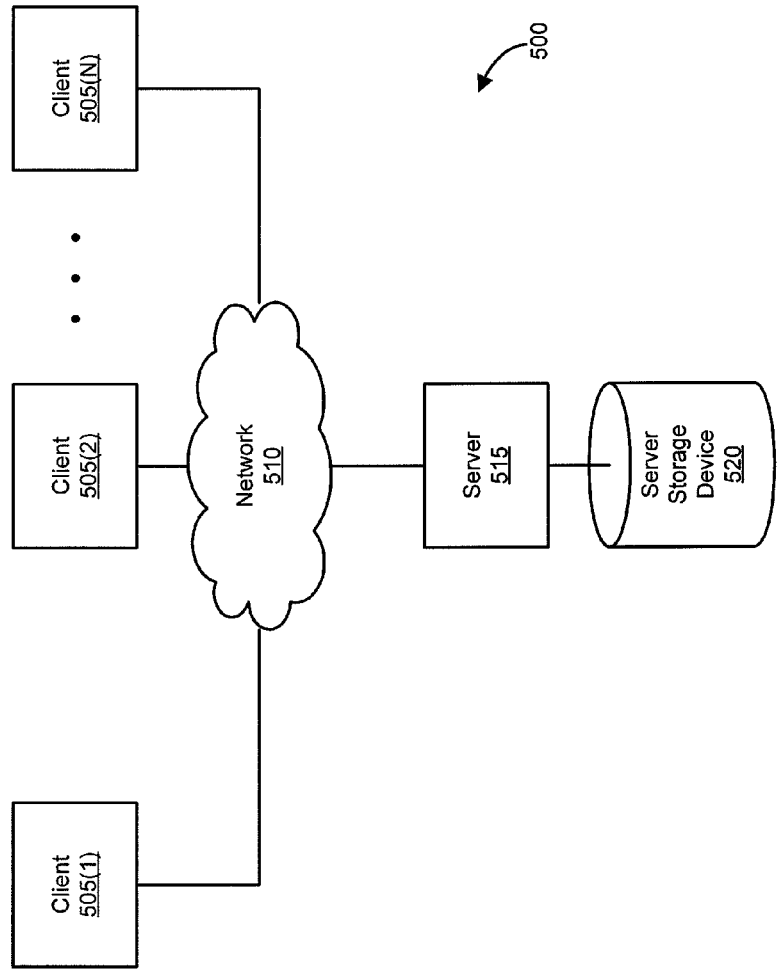
FIG. 5 is a block diagram illustrating a network architecture in which an embodiment of the present invention can be implemented.

FIG. 5 is a simplified block diagram illustrating a network architecture 500 in which one or more clients are provided with access to a server via various network connections. As depicted in FIG. 5, clients 505(1)-(N) are coupled to a network 510, and so are able to access a server 515 (which can be used to implement one of nodes 130(1)-(N) of FIG. 1) via network 510. Other servers (not shown) can be used to implement nodes 130(1)-(N). A client can be implemented using, for example, a desktop computer, a laptop computer, a workstation, a server, a cell phone, a smart phone, a network-enabled personal digital assistant (PDA), or the like. An example of network 510, which can be used by clients 505(1)-505(N) to access server 515, is the Internet. Alternatively, access to server 515 can be provided by a local area network (LAN) utilizing Ethernet, IEEE 802.11x, or some other communications protocol. As will be appreciated, server 515 can be accessed by clients coupled directly thereto (not shown).

As also depicted on FIG. 5, server 515 is coupled to a server storage object 520, which includes a data volume such as cluster shared volume 140 of FIG. 1. Server storage object 520 can be implemented as a single storage object or a collection of storage objects. Server storage object 520 can also be implemented as a storage area network, which couples remote storage objects to a server (e.g., server 515), such that the remote storage objects appear as locally-attached storage objects to the server's OS, for example.

In light of the present disclosure, those of skill in the art will appreciate that server storage object 520 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 500 can include other components such as routers, firewalls and the like that are not germane to the discussion of the present network and will not be discussed further herein. Those of skill in the art will also appreciate that other configurations are possible. For example, clients 505(1)-(N) can be directly coupled to server storage object 520 without the user of a server or Internet; server 515 can be used to implement both the clients and the server; network architecture 500 can be implemented without the use of clients 505(1)-(N); and so on.

As an example implementation of network architecture 500, server 515 (implemented with a node among nodes 130(1)-(N)) services requests to data generated by clients 505(1)-(N) to data stored in server storage object 520 (implemented with cluster shared volume 140). Other servers (not depicted) can be implemented with other nodes among coordinator node 120 and non-coordinator nodes 130(1)-(N). Virtual machines (e.g., virtual machines 125(1)-(N) of FIG. 1) implemented on nodes 130(1)-(N) can be used to service these requests by reading and writing data to and from virtual hard drives 145(1)-(N) on cluster shared volume 140. A backup application (e.g., backup application 205 on FIG. 2) can be implemented on one of nodes 130(1)-(N) to generate full or incremental backups from snapshots in the manner described in FIG. 4B.

Figure 6:
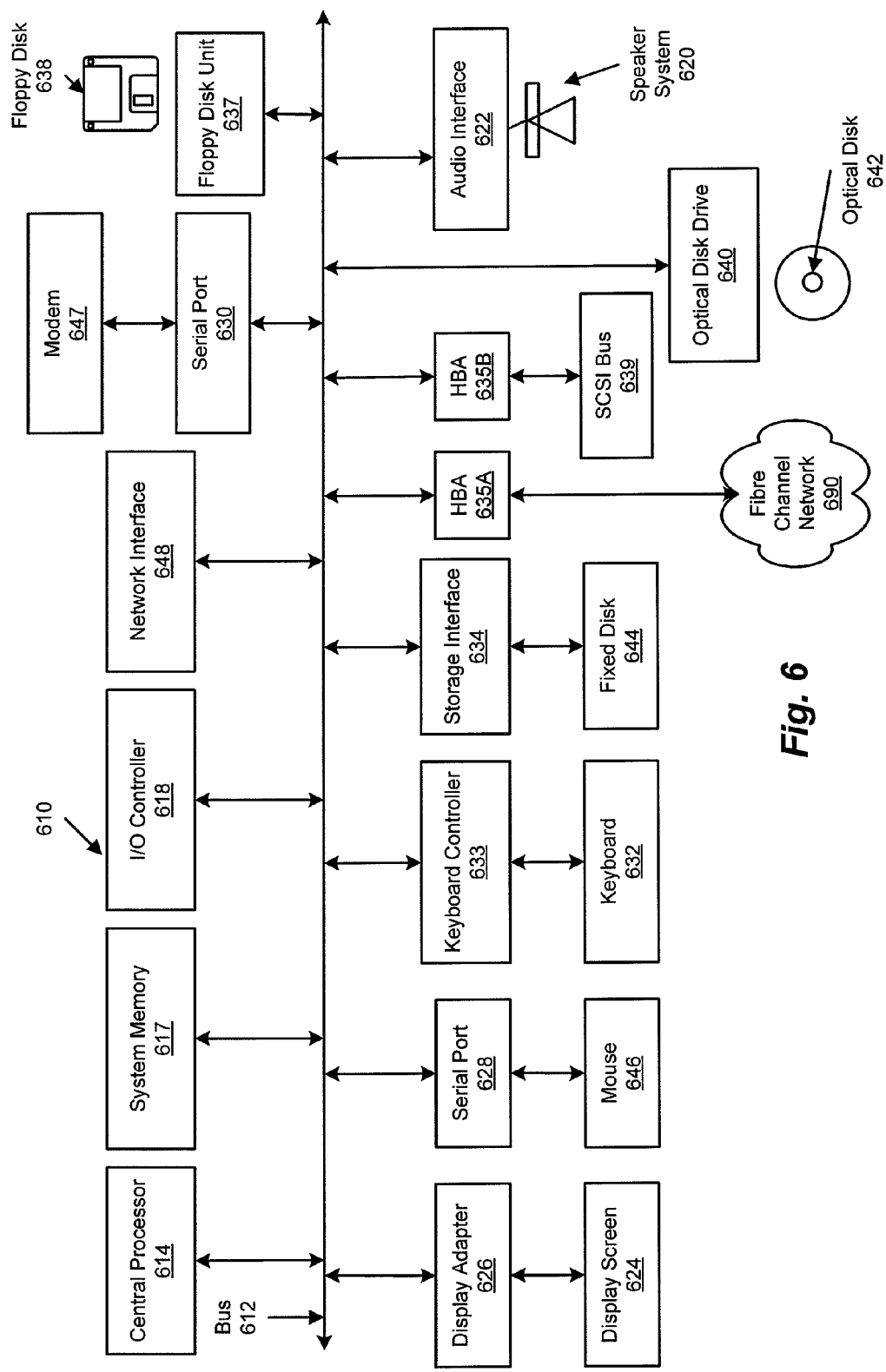
FIG. 6 is a block diagram that illustrates an example of a computer system suitable for implementing embodiments of the present invention.

FIG. 6 depicts a block diagram of a computer system 610 suitable for implementing a server (e.g., nodes 130(1)-(N) of FIG. 1), as well as the clients (e.g., clients 505(1)-505(N) of FIG. 5) used therein. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 610 are generally stored on and accessed via a computer-readable storage medium, such as hard disk drive (e.g., fixed disk 644), an optical drive (e.g., optical drive 640), a floppy disk unit 637, or other computer-readable storage media.

Storage interface 634, as with other storage interfaces of computer system 610, can connect to a standard computer-readable storage medium for storage and/or retrieval of information, such as a fixed disk drive 644. Fixed disk drive 644 may be a part of computer system 610, or may be separate and accessed through other interface systems. Modem 647 can be employed to provide a direct connection to a remote server via a telephone link or to the Internet via an internet service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6. The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The OS provided on computer system 610 can be, for example, MS-DOS®, MS-WINDOWS®, OS/2®, UNIX®, Linux®, or other known OS.

As an example implementation of computer system 610, one of nodes 130(1)-(N) can store backup application 205, file filter driver 210, host operating system 215, hypervisor 220, and virtual machines 125(1)-(3), all of FIG. 2, in computer-readable storage media (e.g., memory 617 and the like). Also, network interface 648 may be used by any of the modules described in nodes 130(1)-(N). For example, backup application 205 can send and receive notifications concerning functions called within node 130(1)-(N) or in other parts of a network, as indicated in FIG. 6.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   intercepting a first write operation, wherein
      said first write operation is a write from a virtual machine to a virtual disk, and
      said first write operation is a change to a first data location;
   recording said change to said first data location, wherein
      said recording creates a first change record, and
      said first change record is stored separately from said first data location;
   performing a first backup operation, wherein
      said first backup operation, said intercepting, and said recording are performed by one or more applications executing on a host of said virtual machine,
      said first backup operation comprises a read request for said first data location, and
      said read request for said first data location is fulfilled based on said first change record;
   identifying said first data location, wherein
      first data of a data structure is stored at said first data location;
   creating a snapshot of said data structure;
   copying said first data to a secondary storage location, wherein,
      said recording comprises associating said first data to said first data location in said first change record,
      said first write operation is performed at said first data location after a completion of said recording and said copying,
      said first backup operation comprises answering said read request from said secondary storage location,
      said first backup operation creates a first backup data structure;
   responsive to a completion of said first backup operation, releasing said first data;
   intercepting a second write operation, wherein
      said second write operation is addressed to said data structure, and
      said second write operation is received after said releasing;
   identifying a second data location, wherein
      said second write operation is a change to said second data location, and
      second data of said data structure is stored at said second data location;
   recording said change to said second data location; and
   performing a second backup operation, wherein
      said second backup operation comprises copying said second data location to a second backup data structure, and
      said second backup operation is an incremental backup of said data structure.

2. The method of claim 1, further comprising,
   installing a file filter driver on an operating system of a virtual machine host, wherein
      said file filter driver performs said intercepting said first write operation,
      a storage object provides storage to said virtual machine host, and
      said virtual disk is associated with a virtual machine hosted by said virtual machine host.

3. The method of claim 1, further comprising,
   installing a data structure filter driver on a hypervisor of a virtual machine host, wherein
      said data structure filter driver performs said intercepting said first write operation,
      a shared storage object provides storage to said virtual machine host, and
      said virtual disk is associated with a virtual machine hosted by said virtual machine host.

4. The method of claim 3, further comprising,
   said virtual machine host first propagating a quiesce event to said virtual machine; and
   said virtual machine second propagating said quiesce event to an application of said virtual machine.

5. The method of claim 1, further comprising,
   determining whether a third write operation is addressed to said data structure, wherein said third write operation is addressed to a shared storage object; and in response to determining that said third write operation is not addressed to said data structure, performing said write operation.

6. The method of claim 1, wherein said secondary storage location is located on a shared storage object; and said first change record is located on a cluster shared volume.

7. A non-transitory computer-readable storage medium storing instructions executable by a processor, said instructions comprising:

a first set of instructions configured to intercept a first write operation, wherein
said first write operation is a write from a virtual machine to a virtual disk, and
said first write operation is a change to a first data location;

a second set of instructions configured to record said change to said first data location, wherein
said second set of instructions further creates a first change record, and
said first change record is stored separately from said first data location;

a third set of instructions configured to perform a first backup operation, wherein
said first backup operation comprises a read request for said first data location, and
said read request for said first data location is fulfilled based on said first change record;

a fourth set of instructions configured to identify said first data location, wherein
first data of a data structure is stored at said first data location;

a fifth set of instructions configured to create a snapshot of said data structure;

a sixth set of instructions configured to copy said first data to a secondary storage location, wherein,
said recording comprises associating said first data to said first data location in said first change record,
said first write operation is performed at said first data location after a completion of said recording and said copying,
said first backup operation comprises answering said read request from said secondary storage location,
said first backup operation creates a first backup data structure; and a seventh set of instructions configured to, responsive to a completion of said first backup operation, release said first data;

an eighth set of instructions configured to intercept a second write operation, wherein
said second write operation is addressed to said data structure, and
said second write operation is received after said releasing;

a ninth set of instructions configured to identify a second data location, wherein
said second write operation is a change to said second data location, and
second data of said data structure is stored at said second data location;

a tenth set of instructions configured to record said change to said second data location; and an eleventh set of instructions configured to perform a second backup operation, wherein said second backup operation comprises copying said second data location to a second backup data structure, and said second backup operation is an incremental backup of said data structure.

8. The non-transitory computer-readable storage medium of claim 7, further comprising, a twelfth set of instructions configured to install a file filter driver on an operating system of a virtual machine host, wherein
said file filter driver performs said intercepting said first write operation,
a storage object provides storage to said virtual machine host, and
said virtual disk is associated with a virtual machine hosted by said virtual machine host.

9. The non-transitory computer-readable storage medium of claim 7, wherein said secondary storage location is located on a shared storage object; and said first change record is located on a cluster shared volume.

10. A system, comprising:

a processor;

a memory coupled to the processor;

a file filter driver configured to
intercept a first write operation, wherein
said first write operation is a write from a virtual machine to a virtual disk, and
said first write operation is a change to a first data location, and
record said change to said first data location, wherein
said file filter driver is located on a host of said virtual machine,
said file filter driver creates a first change record, and
said first change record is stored separately from said first data location,
identify said first data location, wherein
first data of a data structure is stored at said first data location,
copy said first data to a secondary storage location, wherein,
said recording comprises associating said first data to said first data location in said first change record, and
said first write operation is performed at said first data location after a completion of said recording and said copying,
intercept a second write operation, wherein
said second write operation is addressed to said data structure, and
said second write operation is received after releasing first data,
identify a second data location, wherein
said second write operation is a change to said second data location, and
second data of said data structure is stored at said second data location, and
record said change to said second data location; and a backup application configured to
perform a first backup operation, wherein
said backup application is located on said host of said virtual machine,
said first backup operation comprises a read request for said first data location,
said first backup operation comprises answering said read request from said secondary storage location, said first backup operation creates a first backup data structure, said file filter driver is further configured to, responsive to a completion of said first backup operation, release said first data, and said read request for said first data location is fulfilled based on said first change record create a snapshot of said data structure, and perform a second backup operation, wherein said second backup operation comprises copying said second data location to a second backup data structure, and said second backup operation is an incremental backup of said data structure.

11. The system of claim 10, further comprising, an installation module configured to install said file filter driver on an operating system of a virtual machine host, wherein said file filter driver performs said intercepting said first write operation, a storage object provides storage to said virtual machine host, and said virtual disk is associated with a virtual machine hosted by said virtual machine host.

12. The system of claim 10, further comprising, an installation module configured to install said filter driver on a hypervisor of a virtual machine host, wherein said data structure filter driver performs said intercepting said first write operation, a shared storage object provides storage to said virtual machine host, and said virtual disk is associated with a virtual machine hosted by said virtual machine host.

13. The system of claim 12, wherein, said operating system is configured to first propagate a quiesce event to said virtual machine; and said virtual machine is configured to second propagate said quiesce event to an application of said virtual machine.

14. The system of claim 10, wherein said secondary storage location is located on a shared storage object; and said first change record is located on a cluster shared volume.

\* \* \* \* \*